United States Patent

Bishop et al.

[11] 4,127,894
[45] Nov. 28, 1978

[54] CONVERTER PROTECTION CIRCUIT OPERATIVE TO LIMIT AND COUNTERACT TRANSFORMER SATURATION

[75] Inventors: John D. Bishop, Morristown; Patrick W. Clarke, Murray Hill; William J. Schatz, Millington, all of N.J.

[73] Assignee: Bell Telephone Laboratories, Incorporated, Murray Hill, N.J.

[21] Appl. No.: 851,519

[22] Filed: Nov. 14, 1977

[51] Int. Cl.² ............................................. H02M 1/18
[52] U.S. Cl. ....................................... 363/56; 363/80
[58] Field of Search ................................. 363/24–26, 363/55, 56, 79, 80, 133, 134

[56] References Cited

U.S. PATENT DOCUMENTS

| 3,697,855 | 10/1972 | Kernick et al. | 363/56 |
| 3,743,916 | 7/1973 | Weischedel et al. | 363/23 |
| 3,859,583 | 1/1975 | Reed | 363/26 |
| 3,873,903 | 3/1975 | Koetsch et al. | 363/25 |

Primary Examiner—William M. Shoop
Attorney, Agent, or Firm—Alfred George Steinmetz

[57] ABSTRACT

Primary and secondary currents of a converter transformer in a double-ended converter are continuously monitored to detect the onset of saturation in the magnetic core of the transformer. When the onset condition is detected, the conductive roles of the oppositely phased switching transistors in the converter are reversed to limit and counteract the onset of saturation in the magnetic core of the transformer.

13 Claims, 4 Drawing Figures

CONVERTER PROTECTION CIRCUIT OPERATIVE TO LIMIT AND COUNTERACT TRANSFORMER SATURATION

BACKGROUND OF THE INVENTION

1. Field of the Invention

This invention relates to power supplies and DC to DC converter systems utilizing double-ended driven inverter circuits. It is specifically concerned with the prevention of continued magnetic saturation in the core of the inverter power transformer and limitation of its deleterious effects.

Switching devices in double-ended inverter circuits may alternately apply unequal volt seconds to the inverter transformer if they are improperly matched. Such improper matching or mismatches may be due to wide tolerances in the characteristics of the oppositely phased switching devices or may occur due to changes in these characteristics due to the age of the switching device. In other instances these characteristics may change with variation in the operating temperature of the switching device. In any case, if the operating characteristics of the switching devices are not matched, the signal magnitudes conducted by the devices in response to identical driving signals may be unequal.

Such imbalances may occur even if the characteristics of the switching devices are evenly matched. These imbalances may occur due to imbalances in the driving circuitry which biases the switching devices into their conductive condition.

As a consequence of these imbalances in the switching devices or its driving signals, the alternately directed volt seconds supplied to the primary winding of the power transformer are not balanced. The volt seconds applied to the primary winding in one direction are greater in magnitude than the oppositely phased volt seconds applied in the other direction. The magnetic flux produced by these unequally matched, oppositely phased volt seconds during alternate half cycles does not cancel but instead permits the creation of a unidirectional DC flux in the magnetic core of the power transformer. This unidirectional flux increases in magnitude during successive cycles of operation and saturation eventually occurs in the magnetic core.

A consequence of saturation in the transformer core is to permit a large peak transient current to flow through one of the switching devices due to the reduced inductive impedance presented by the transformer. It is not uncommon for this peak transient current to have a magnitude as much as five times the magnitude of the normal load current. This high transient current may cause overheating and degradation in the switching device. In the case where the switching device is a switching transistor, a significant increase in collector load current seriously reduces the operational life of the transistor and may necessitate premature replacement of the switching transistor.

2. Prior Art

Solutions to this saturation problem have been previously devised for application to pulse width modulated converter circuits. In these circuits the oppositely phased currents flowing through the oppositely phased switching devices are monitored and compared. If a current imbalance in the switching devices occurs, the duty cycle of the switching devices is modified to restore the current balance.

Examples of this particular solution are disclosed in H. R. Weischedel et al. U.S. Pat. No. 3,870,943, issued Mar. 11, 1975, and in R. A. Reed U.S. Pat. No. 3,859,583, issued Jan. 7, 1975. Both of these patents are assigned to the same assignee to which the present application is assigned.

This solution has limitations. It is limited in application to pulse width modulated converter circuits. Furthermore, it measures only the current magnitude and balance in the alternately phased switching devices as opposed to responding to the condition of saturation in the transformer. The volt seconds balance of an applied signal is a more accurate measure of saturation than the current magnitude balance. Hence, in these circuits the current magnitude may be balanced and saturation may still occur in the transformer.

Another solution of the transformer saturation problem is to protect the switching devices independently of the condition of saturation in the transformer. In this approach currents flowing in each switching device are monitored and compared with a predetermined current limit. When this current limit is exceeded, current conduction in the switching device is terminated. A solution of this type is disclosed in D. M. Mitchell et al. U.S. Pat. No. 3,927,363, issued Dec. 16, 1975.

The Mitchell patent discloses a self-oscillating inverter circuit having a normally saturating transformer. It includes switching transistors which are cut off in response to a protection circuit which responds to a particular threshold of the collector-emitter current in the switching transistor. The purpose of this protection circuit is to limit current flow through the switching transistors and not to prevent transformer saturation.

It is apparent from the foregoing discussion that an adequate protection circuit to prevent saturation of the inverter transformer must operate to respond to the actual condition of saturation in the core of a transformer and not just to a current balance or a predetermined current limit in the switching devices.

SUMMARY OF THE INVENTION

Therefore, in accordance with the principles of the invention disclosed herein, a converter circuit includes protection circuitry to limit and counteract saturation in the magnetic core of the power transformer of its included driven inverter circuit. It operates by monitoring signals in a primary winding and secondary winding of the inverter transformer to detect the onset of saturation in the magnetic core. Upon the onset of saturation, the protection circuitry is operative to immediately reverse the direction of voltage applied to the primary winding by reversing the conductive roles of the oppositely phased switching devices in the inverter circuit.

In a particular embodiment of the invention the magnitudes of currents flowing in the primary winding and secondary winding of the power transformer are continuously monitored. Voltage signals responsive to these current magnitudes are applied to a voltage comparison circuit. Under normal operating conditions the signal levels at the input to the voltage comparator are adjusted so that the signal voltage magnitude responsive to the secondary current slightly exceeds the signal voltage magnitude responsive to the primary current. Upon the onset of saturation of the transformer core, the primary current rapidly increases. This increase is coupled with a rapid decrease in the current in the secondary winding. Hence upon the onset of transformer saturation, the voltage signal responsive to the increasing primary current applied to the comparator rapidly exceeds the voltage signal responsive to the decreasing secondary current applied to the comparator. The output of the comparator changes state in response to these signal magnitude changes. This output signal state change is applied to the switching drive circuit of the inverter circuit and is utilized therein to immediately effect the reversal of the conductive roles of the two oppositely phased switching devices of the inverter. This reverses the direction of voltage applied to the primary winding and the resulting current flow direction generates magnetic flux which brings the magnetic core out of the saturation condition. This protection circuitry responds primarily to the onset occurrence of saturation of the transformer core and advantageously operates to limit and counteract the condition of saturation in the transformer core.

DETAILED DESCRIPTION

Figure 1:
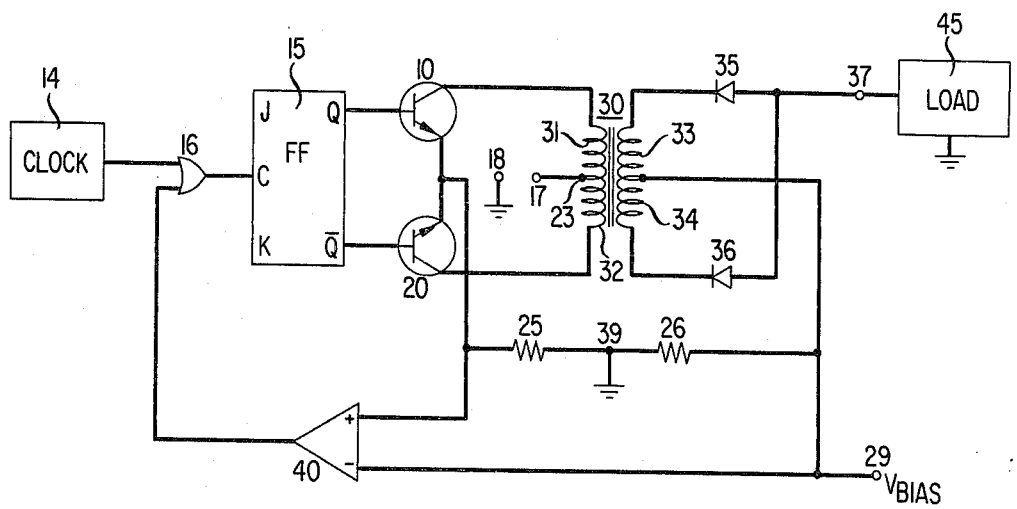
FIG. 1 is a combined block diagram and circuit schematic of a power DC to DC converter circuit with protection circuitry embodying the principles of the invention to limit and counteract saturation of the transformer core.

FIG. 1 discloses a DC to DC converter system including a square wave driven inverter having a fixed duty cycle. In the illustrative embodiment this is a 50 percent duty cycle but the invention need not be limited to this value. A DC voltage source is applied to the input terminals 17 and 18 of the converter. Input terminal 18 is grounded and input terminal 17 is connected to center tap 23 of the primary winding of the converter transformer 30. This DC input source may comprise a battery, a regulated DC voltage source, or any other suitable DC voltage source.

Two oppositely phased switching transistors 10 and 20 are connected to the primary winding segments 31 and 32, respectively, of transformer 30. These switching transistors are alternately driven conductive in response to the complementary output states of the J-K flip-flop 15. The J-K flip-flop 15 is driven into its alternate states in response to a clock source 14. The output of clock 14 is coupled through OR gate 16 to the clock or toggle input C of the J-K flip-flop 15. As flip-flop 15 alternately drives transistors 10 and 20 conducting, the primary winding segments 31 and 32 of transformer 30 alternately conduct current.

Transformer output currents appear in the output winding segments 33 and 34 and are rectified by the rectifying diodes 35 and 36. The rectified DC signal is applied via output terminal 37 to a load circuit 45.

As long as the signals conducted by transistors 10 and 20 to the primary winding of transformer 30 have equal and opposite voltage seconds, the oppositely directed alternate fluxes generated in the core of transformer 30 cancel each other. If, however, the signals conducted by transistors 10 and 20 become unbalanced so that the volt seconds applied to windings 31 and 32 are no longer in balance, a unidirectional flux is generated in the magnetic core of transformer 30. Under this unbalanced signal condition, a unidirectional flux builds up until saturation occurs in the core of transformer 30. Saturation of the core permits an excessive current to flow in one of the switching transistors 10 and 20 which, as described above, may result in damage to the switching transistor affected and consequently significantly reduce the operational life span of the switching transistor.

The converter circuit of FIG. 1 advantageously includes protection or saturation limiting circuitry to limit and counteract the onset occurrence of such transformer saturation. This saturation limiting circuitry includes circuitry to monitor both a primary and secondary current of the transformer and circuitry to respond to an onset occurrence of saturation to reverse the conducting roles of the switching transistors 10 and 20. A resistor 25 is coupled to monitor current flow in the primary winding of transformer 30. Resistor 25 is connected between a node common to the emitters of transistors 10 and 20 and to ground 39. A resistor 26 is coupled to monitor current flow in the secondary winding of transformer 30. Resistor 26 is coupled between a center tap 24 of the secondary transformer winding and ground 39.

The voltage drops across the resistor 25 and the resistor 26 are coupled to the noninverting and inverting inputs, respectively, of a voltage comparator 40. The output of the voltage comparator 40 is coupled via OR gate 16 to the toggle or clock input of the J-K flip-flop 15. A DC voltage bias is supplied to terminal 29 which in turn is coupled to the inverting input of the comparator circuit 40 and is provided merely to facilitate startup of the converter circuit.

Figure 2A:
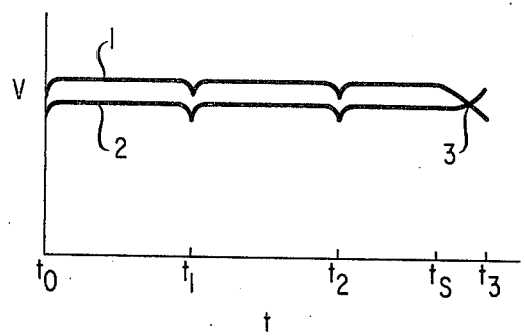
FIGS. 2A and 2B disclose voltage waveforms and magnetization curves, respectively, to assist in understanding the operation of the circuit shown schematically in FIG. 1.

As described above, the voltage drops occurring across resistor 25 and resistor 26 are a function of the primary and secondary currents in the converter circuit. The relative magnitudes of these resistors are selected so that under nonsaturated operating conditions the voltage drop across resistor 26 slightly exceeds the voltage drop across resistor 25. These voltage drop waveforms may be seen in FIG. 2A wherein the waveform 1 designates the voltage drop across the resistor 26. Waveform 2 designates the voltage drop occurring across resistor 25. It is readily apparent that normal operating conditions prevail during the time interval designated $T_0$-$T_1$ and $T_1$-$T_2$ wherein the voltage drop across resistor 26 continuously exceeds the voltage drop across resistor 25. During the subsequent time interval designated $T_2$-$T_3$ the onset of saturation of the core transformer 30 occurs at the time indicated $T_s$. As a result of this beginning saturation condition, which occurs at the indicated time $T_s$, the voltage drop across resistor 25 increases while the voltage drop across resistor 26 decreases due to saturation in the transformer core. At a crossover point identified by node 3, the voltage drop across resistor 25 exceeds the voltage drop across resistor 26. As a result, the voltage applied to the noninverting input of comparator 40 now exceeds the voltage applied to the inverting input of comparator 40 and the output of comparator 40, which has been in a low signal state, changes state to a high signal state. This changed signal state is applied via OR gate 16 to the toggle input C of the J-K flip-flop 15. The J-K flip-flop 15, in response to this signal, immediately reverses its output state and, hence, the drive signals to the switching transistors 10 and 20 are immediately reversed causing an immediate reversal in the conduction roles of transistors 10 and 20.

Each time the switching transistor subject to excess current due to the saturation condition is switched into conduction and saturation occurs, the output of comparator 40 in response thereto changes state. The conductive roles of switching transistors 10 and 20 are reversed and the converter transformer is being driven into a nonsaturating condition in response to the operation of the protection circuitry.

Figure 2B:
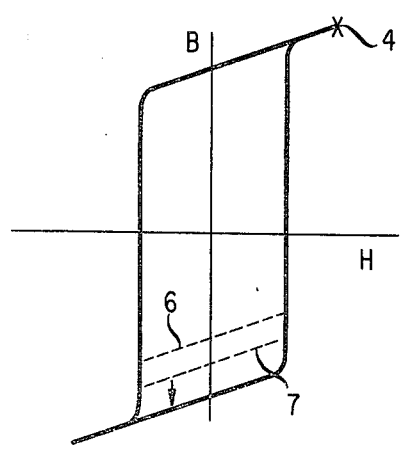

The remedial effect of a reversal of conductive states or roles of transistors 10 and 20 may be seen by examining the magnetization curve 5 in FIG. 2B. Assume that in response to unbalanced conditions saturation onset has occurred at point 4 in the magnetization curve. The protection circuitry effects the immediate reversal of conductive roles of the switching transistors and the magnetic state of the core returns to the dotted line magnetization curve 6. At the next reversal of conducting roles saturation will again occur in a region close to but not as far into saturation as point 4. A subsequent reversal of conduction roles brings the magnetization state to the dotted line magnetization curve 7 and eventually the magnetization state will advance beyond line 7 to the point where the oppositely phased maximum magnetization points are equalized and not saturated. Upon the occurrence of magnetic balance, both switching transistors 10 and 20 will again conduct for their full conducting cycles.

Figure 3:
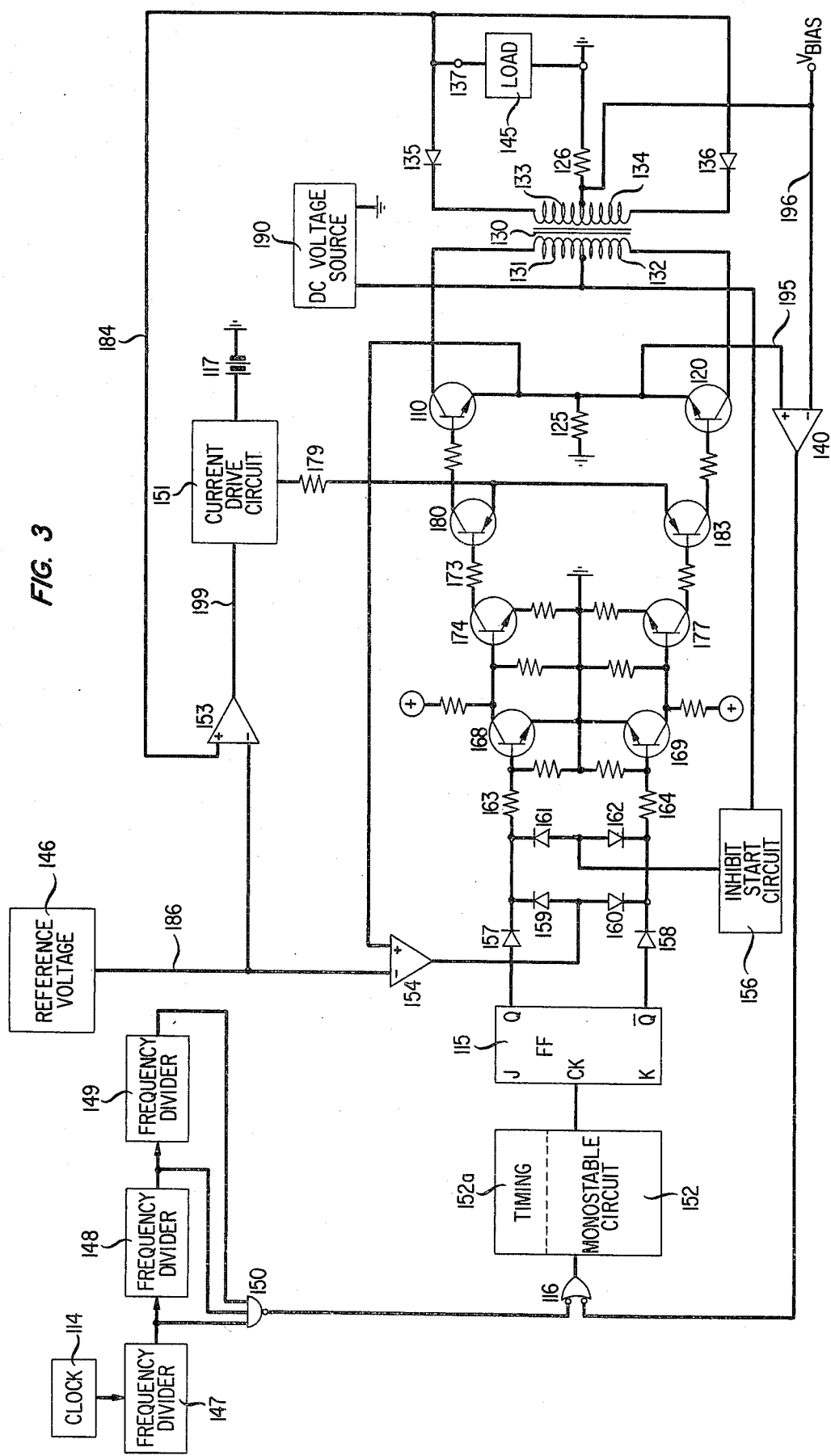
FIG. 3 is a detailed block diagram and circuit schematic of a DC to DC converter circuit including circuitry to limit and counteract transformer core saturation embodying the principles of the invention.

A detailed block and schematic of the converter circuit embodying the principles of the invention is disclosed in FIG. 3. In this circuit the basic signal frequency to drive the converter circuit is supplied by a clock 114. The clock 114 may comprise any suitable signal source having a stable frequency such as an integrated astable circuit or other similar signal frequency generator. In the illustrative embodiment herein the frequency of the clock source 114 is chosen to be 16.2 kHz; however, it is to be understood that any frequency can be used without departing from the scope of the invention.

The signal output of the clock 114 is applied to three frequency dividers 147, 148, and 149 which are connected in a cascade or series connection. These frequency dividers may comprise integrated counter circuits which operate in a frequency division mode. The individual outputs of the frequency dividers 147, 148, and 149 are applied in parallel to a NAND gate 150. The purpose of this parallel application to a NAND gate is to generate a narrow frequency divided signal which occurs only upon signal level coincidence of the output pulse signals of the three frequency dividers 147, 148, and 149. A narrow frequency divided pulse signal is generated at the output of NAND gate 150. In the illustrative circuit disclosed herein the frequency divided output of NAND gate 150 is a short pulse with a frequency of 120 Hz. It is to be understood that the frequency is only illustrative and does not limit the frequency of operation of the circuit.

The signal output of NAND gate 150 is applied via an OR gate 116 to a monostable circuit 152. The monostable circuit 152 may comprise an integrated monostable multivibrator with adjustable timing circuitry to control the interval between responding to successive input triggering pulses. Accordingly, in the illustrative embodiment the monostable circuit 152 includes a timing circuit 152A which may comprise an external RC timing circuit. The purpose of the monostable circuit 152 is to delay the transmission of a second pulse succeeding an initial pulse for a predetermined time interval. The succeeding pulse is transmitted when this predetermined time interval has expired. Such monostable circuits are well known in the integrated circuit art and it is not believed necessary to describe it in detail.

The output of the monostable circuit 152 is applied to the clock or toggle input of a J-K flip-flop 115. J-K flip-flop 115 may comprise an integrated flip-flop including gating circuitry to perform logic operations in the J-K input so that the output of the J-K flip-flop changes state automatically in response to each pulse input to its clock input.

The opposite states of the J-K flip-flop output are used to control the phasing of the alternately phased switching transistors 110 and 120 of the converter circuit. For example, the output Q of the J-K flip-flop 115 is applied via diode 157 and resistor 163 to the base of transistor 168. The $\bar{Q}$ output of the J-K flip-flop 115 is applied via diode 158 and resistor 164 to the base of transistor 169.

The collector of transistor 168 is coupled to drive transistor 174. When transistor 168 conducts, transistor 174 is nonconductive, and vice versa. Similarly, transistor 169 drives transistor 177 and when transistor 169 is conducting transistor 177 is nonconducting. The collector of transistor 174 is coupled via resistor 173 to drive transistor 180. When transistor 174 conducts transistor 180 also conducts. In a like fashion transistor 177 drives transistor 183.

A current drive circuit 151 applies a controlled current via resistor 179 to the emitter terminals of transistors 180 and 183. The controlled current supplied by the current drive circuit 151 is responsive to the output of a comparator 153. Comparator 153 senses the output voltage of the converter, via lead 184, and compares it with a reference voltage on lead 186 supplied by a reference voltage source 146. An error signal is generated in response to this comparison. This error signal is applied via lead 199 to the current drive circuit 151. The current drive circuit 151 is energized by the DC voltage source 117 and generates an output current whose magnitude is a function of the error signal. This output current is applied to resistor 179. The current drive circuit may be embodied as a differential amplifier. Such circuits are well known in the art and need not be disclosed in detail.

The magnitude of the current flow through the collector-emitter path of transistors 180 and 183 is responsive to the magnitudes of the output voltage of the converter. The transconductive current flow through the collector-emitter path of transistors 180 and 183 supplies the base drive current applied to the switching transistors 110 and 120. Transistors 110 and 120 are operated in their active region. Their specific conductivity determines the magnitude of the inverted DC signal applied to the primary winding segments 131 and 132 of the converter transformer 130.

The alternate conduction of transistors 110 and 120 periodically applies DC voltage supplied by the DC voltage source 190 to the primary winding segments 131 and 132. As is described above, transistors 110 and 120 are operated in their active region to regulate the output voltage of the converter by controlling the conductive impedance of transistors 110 and 120.

The output signal of the two secondary winding segments 133 and 134 is rectified by rectifying diodes 135 and 136 and applied, via output terminal 137, to a load 145 to be energized.

Resistors 125 and 126 are connected to sense current magnitude in the primary and secondary windings of the converter transformer 130. The voltage drops across the resistors 125 and 126 are functions of the primary and secondary current magnitudes, respectively. The voltage across resistor 126 is applied via lead 196 to the inverting input of the voltage comparator 140. The voltage across resistor 125 is applied, via lead 195, to the noninverting input of the voltage comparator 140. The output of the comparator circuit 140 is applied to the OR gate 116 to trigger the J-K flip-flop 115.

A current limit circuit is included to limit maximum current flowing through the switching devices 110 and 120. The voltage across resistor 125 is applied, via lead 185, to a noninverting input of the voltage comparator 154. A reference voltage supplied by the reference voltage source 146 is applied to the inverting input of the comparator 154. The output of comparator 154 is applied, via lead 197, to a node common to the cathodes of diodes 159 and 160, included in the drive circuitry for the switching transistors 110 and 120. In the event of a detected overcurrent, the output of comparator 154 forward biases diodes 159 and 160 and applies a signal therethrough to simultaneously turn on transistors 168 and 169 and hence inhibit operation of switching transistors 110 and 120 of the converter circuit.

The converter circuit also includes an inhibit starting circuit 156 which monitors the DC input voltage level, via lead 198, and applies an initial inhibit signal to a node common to the anodes of diodes 161 and 162 to inhibit operation of the converter circuit if the input voltage level is below a predetermined threshold. The inhibit signal operates by biasing transistors 168 and 169 conductive which in turn renders switching transistors 110 and 120 nonconductive in the manner described hereinabove. When the DC input voltage achieves its acceptable threshold level, the inhibit signal is removed and the inverter is free to operate.

The invention may be readily understood by describing the operation of the converter circuit disclosed in FIG. 3. The clock source 114 generates a signal frequency which in the illustrative embodiment is 16.2kHz. This signal is applied to the cascaded frequency dividers 147, 148, and 149. The outputs of these frequency dividers 147, 148, and 149 are connected in parallel to the NAND gate 150. A narrow switching pulse is obtained at the output of NAND gate 150 having a frequency in the illustrative embodiment of 120 Hz. This pulse is applied via OR gate 116 to the monostable circuit 152. Under normal operating conditions this pulse is reproduced at the output of monostable circuit 152 and is applied to the clock input of the J-K flip-flop 115. The Q and $\bar{Q}$ outputs of flip-flop 115 change state in response to each clock input pulse. The Q and $\bar{Q}$ signal states are transmitted via diodes 157 and 158 to alternately drive transistors 168 and 169 conducting. As described above, the conductive states of transistors 168 and 169 control the conductive states of transistors 180 and 183, and also in turn the conductive states of switching transistors 110 and 120.

The current magnitude supplied by the current drive circuits to transistors 180 and 183 determines the transconductive impedance level in transistors 110 and 120, and hence the magnitude of the output voltage applied to the load 145.

If the transistors 110 and 120 conduct unequally due to any reason, a DC current component is established which generates an increasing unidirectional flux in the core of transformer 130 eventually causing saturation therein. When saturation occurs, the collector current of one of the switching transistors increases beyond its normal range upon the onset of saturation. The projection circuitry immediately responds to oppose the onset of saturation.

An onset of saturation of the transformer core is determined as described above by monitoring a voltage magnitude across the resistors 125 and 126 which are connected to respond to the magnitude of primary and secondary currents. Normally saturation first occurs near the end of the switching cycle. When this occurs, the reversed relative voltage levels across resistors 125 and 126 subsequent to the crossover point which are indicative of the onset of saturation are applied to the voltage comparator 140. The output of the comparator 140 changes state. This change in state embodied in a step voltage is applied to the monostable circuit 155 which reproduces the step voltage as a pulse output and applies it to OR gate 116. This signal is transmitted by the monostable pulsing circuit 152 to the clock input of J-K flip-flop 115 thereby reversing the conductive roles of transistors 110 and 120. The output of the comparator 140 continues to respond to saturation to reverse conductive roles until magnetic balance is established and the threat of saturation is removed.

If frequency stability is not needed the time interval between successive pulses is not needed and the switching transistors may be permitted to change conductive roles at any time in their cycle of operation.

Many variations of this form of protection against transformer saturation may be devised by those skilled in the art without departing from the spirit and scope of the invention.

What is claimed is:

1. Transformer saturation limitation means comprising in combination:
   signal comparison means including
   first input means to accept signals responsive to current in a transformer primary;
   second input means to accept signals responsive to current in a transformer secondary; and
   means responsive to an output of said signal comparison means to reverse a polarity of voltage applied to the transformer primary when an output of the signal comparison means indicates an occurrence of saturation of a magnetic core common to said transformer primary and secondary.

2. Transformer saturation limitation means as defined in claim 1 wherein said means to reverse a polarity of voltage comprises:
   a first switching device coupled to one terminal of said transformer primary and to a source of energy;
   a second switching device coupled to a terminal opposite said one terminal of said transformer primary and to a source of energy; and
   control means for biasing said first and second switching devices alternately conductive and operative in response to said signal comparison means for reversing conductive roles of said first and second switching devices.

3. Transformer saturation limitation means as defined in claim 1 wherein said first and second input means are adjusted in impedance so that a signal responsive to current in the transformer secondary is greater than a signal responsive to current in the transformer primary during nonsaturated operating conditions in the transformer, said signal comparison means responsive to a change of relative magnitude of signals at said first and second inputs, and including means to generate a signal to effect a reverse of polarity of voltage applied to the transformer primary.

4. A protection circuit responding to occurrences of saturation in a transformer driven by periodic alternately directed currents comprising:
first signal sensing means to monitor a primary current;
second signal sensing means to monitor a secondary current;
comparison means responsive to said first and second signal sensing means, and having an output indicative of the relative signal magnitudes; and
means responsive to an output of said comparison means indicative of saturation and operative to reverse direction of said periodic alternately directed currents.

5. A protection circuit as defined in claim 4 further including:
means for generating the periodic alternately directed current including a first switching device coupled to one terminal of a primary winding of said transformer, a second switching device coupled to a terminal opposite said one terminal of a primary winding of said transformer;
said first and second switching devices coupled to a source of DC voltage; and
biasing means for alternately driving said first and second switching means conductive and including said means operative to reverse direction including a toggle input responsive to an output of said comparison means to reverse conductive modes of said first and second switching devices.

6. A protection circuit as defined in claim 5 wherein said first and second signal sensing means include first and second impedances having magnitudes selected so that during nonsaturated operation a voltage drop across said second impedance exceeds a voltage drop across said first impedance, a reversal of relative magnitude of voltage drops indicating an occurrence of saturation in said transformer.

7. In a power supply having a transformer alternately energized by oppositely directed volt second signals, means to counteract saturation of said transformer due to inequality of the oppositely directed volt second signals comprising:
first means coupled to monitor primary currents of said transformer;
second means coupled to monitor secondary currents of said transformer;
comparison means responsive to the respective magnitudes of said primary and secondary currents; and
means for changing the direction of volt second signals energizing said transformer in response to said comparison means.

8. In a power supply as defined in claim 7:
input means to accept a DC voltage source;
first switching means coupling said input means to a first terminal of a primary winding of said transformer;
second switching means coupling said input means to a second terminal of a primary winding of said transformer;
bias means to generate a controlled drive signal to control a conductivity of said first and second switching means;
periodic phasing means to periodically alternately direct the controlled drive signal to alternately bias the first and second switching means conducting;
the periodic phasing means including said means for changing a direction of current operative in response to an output of said comparison means to reverse the conductive roles of said first and second switching means in advance of normal periodic occurrence.

9. In a power supply as defined in claim 7 wherein:
said first means to monitor primary current and said second means to monitor secondary current generate signals having a first relative magnitude ranking during nonsaturated intervals of transformer operation and a second relative magnitude ranking during saturated intervals of transformer operation.

10. In a power supply as defined in claim 8 wherein:
said periodic phasing means includes an astable circuit responsive to a clock input to change output phase and said means for changing direction includes means to direct an output of said comparison means to a clock input of said astable circuit.

11. In a power supply having a transformer coupling, an input and an output, first and second switching means alternately coupling the input to opposite terminals of a primary winding of said transformer, respectively,
protection means to oppose the occurrence of saturation in a core of said transformer comprising:
primary sensing means coupled to sense a current magnitude flowing through at least a portion of said primary winding;
secondary sensing means coupled to sense a current magnitude flowing through at least a portion of a secondary winding of said transformer;
comparison means having inputs coupled to said sensing means and to said secondary sensing means and having an output responsive to relative signal magnitudes supplied thereby; and
switch control means coupled to the output of said comparison means and operative to reverse conductive roles of said first and second switching means in response to an output of said comparison means indicative of relative signal magnitudes resulting from saturation of said transformer.

12. In a power supply as defined in claim 11 further including:
a current limit means comprising
a reference signal source;
means for generating a current limit control signal responsive to a signal output of said primary sensing means and to said reference signal means; and
means responsive to said current limit control signal to inhibit operation of said first and second switching means.

13. In a power supply as defined in claim 11 further including:
regulation control means comprising
means for monitoring an output signal of said power supply;
a reference signal source;
means for generating an error signal responsive to said reference signal source and said means for monitoring an output signal;
bias signal generator means to generate a bias signal responsive to said error signal, and operative to control a transconductive impedance of said switching means to control a signal magnitude applied to said primary winding of said transformer.

* * * * *